US012020344B2

(12) United States Patent
Lee

(10) Patent No.: US 12,020,344 B2
(45) Date of Patent: Jun. 25, 2024

(54) HIGHLY PARALLEL VIRTUALIZED GRAPHICS PROCESSORS

(71) Applicant: Vizzio Technologies Pte Ltd, Singapore (SG)

(72) Inventor: Seng Fook Lee, Singapore (SG)

(73) Assignee: Vizzio Technologies Pte. Ltd., Singapore (SG)

( * ) Notice: Subject to any disclaimer, the term of this patent is extended or adjusted under 35 U.S.C. 154(b) by 114 days.

(21) Appl. No.: 17/752,883

(22) Filed: May 25, 2022

(65) Prior Publication Data

US 2022/0383445 A1 Dec. 1, 2022

Related U.S. Application Data

(63) Continuation-in-part of application No. 17/577,369, filed on Jan. 17, 2022, and a continuation-in-part of application No. 17/521,874, filed on Nov. 9, 2021.

(60) Provisional application No. 63/192,576, filed on May 25, 2021, provisional application No. 63/192,578, filed on May 25, 2021, provisional application No. 63/192,577, filed on May 25, 2021.

(51) Int. Cl.
*G06T 1/20* (2006.01)
*G06F 9/455* (2018.01)

(52) U.S. Cl.
CPC .......... *G06T 1/20* (2013.01); *G06F 9/45558* (2013.01)

(58) Field of Classification Search
None
See application file for complete search history.

(56) References Cited

U.S. PATENT DOCUMENTS

| 10,169,841 | B1* | 1/2019 | Featonby | G06F 9/45533 |
| 2007/0294512 | A1* | 12/2007 | Crutchfield | G06F 8/443 |
| | | | | 712/E9.033 |
| 2007/0294663 | A1* | 12/2007 | McGuire | G06F 9/54 |
| | | | | 717/108 |
| 2017/0161204 | A1* | 6/2017 | Roberts | G06T 1/60 |
| 2020/0410628 | A1* | 12/2020 | Shah | G06F 9/45558 |
| 2021/0117243 | A1* | 4/2021 | Ghafourifar | G06F 9/48 |
| 2022/0147320 | A1* | 5/2022 | Lee | G06F 9/4881 |
| 2022/0188135 | A1* | 6/2022 | Jiang | G06F 9/526 |

FOREIGN PATENT DOCUMENTS

GB 2579721 A * 7/2020 ......... G06F 12/1009

* cited by examiner

*Primary Examiner* — Philip Wang
(74) *Attorney, Agent, or Firm* — HORIZON IP PTE. LTD.

(57) ABSTRACT

The present disclosure is directed to a processing system with a virtualized graphics processor for highly parallel processing of graphics tasks as well as other computing tasks. The processing system includes a central processing unit (CPU) configured with a virtualization stack which includes a graphics processing unit (GPU) having hundreds to thousands of GPU cores virtualized into virtual machines (VMs). The GPU cores are loaded with low-level programming routines for graphics tasks. Different GPUs are loaded with different types of programming routines based on their respective dedicated graphics tasks. The cores are segmented into VMs based on the graphics task. By utilizing virtualized GPUs, highly parallel processing of graphics tasks can be achieved.

20 Claims, 4 Drawing Sheets

HIGHLY PARALLEL VIRTUALIZED GRAPHICS PROCESSORS

CROSS-REFERENCE TO RELATED APPLICATION

This application is a continuation-in-part of the US Patent Application filed on Nov. 9, 2021, with application Ser. No. 17/521,874, titled HIGHLY PARALLEL PROCESSING SYSTEM and also US Patent Application filed on Jan. 17, 2022, with application Ser. No. 17/577,369, titled GEOSPATIAL MAPPING. This application also claims the benefit of U.S. Provisional Applications with Ser. Nos. 63/192,576, 63/192,578, and 63/192,577, which were all filed on May 25, 2021. All disclosures are herein incorporated by reference for all purposes.

FIELD OF THE INVENTION

The present disclosure generally relates to virtualized highly parallel virtualized graphics processors. In particular, a highly parallel virtualized graphic processor enables fast and efficient processing of graphics applications, particularly 2D to 3D geospatial applications.

BACKGROUND

The proliferation of process-intensive applications, such as 3D graphics and artificial intelligence (AI) applications based on big data analytics, has driven the need for computers with significant processing power. For example, geospatial graphics applications for 2D to 3D graphics conversion are data and compute intensive. Without significant processing power, such applications would take an exorbitant amount of time to perform, possibly rendering the results outdated or missing key deadlines. Conventional computers, however, are inadequate to provide the needed processing power to run these highly process-intensive applications.

The present disclosure is directed to a processing system with a virtualized graphics processor for highly parallel processing of graphics tasks as well as other computing tasks.

SUMMARY

An embodiment of the disclosure relates to a processing system. The processing system includes a central processing unit (CPU) and a virtualization stack, wherein the virtualization stack. The virtualization stack includes a graphics processing unit (GPU) having a multitude of GPU cores. The GPU cores are loaded with low-level graphics routines for performing graphics tasks. The virtualization stack includes virtualized GPUs. The GPU cores of respective virtualized GPUs are loaded with the same low-level language graphics routine for performing the same graphics task. The virtualization stack also includes a dispatcher for assigning graphics tasks to the VMs based on a graphics job request from the CPU depending on the tasks and workload requirements of the job request.

Another embodiment of the disclosure relates to a method for highly parallel processing of a graphics program. The process includes running the graphics program by a central processing unit (CPU). A graphics job request is generated according to the graphics program. The graphics job request is sent to a virtualization stack. The virtualization stack includes a graphics processing unit (GPU) having a multitude of GPU cores. The GPU cores are loaded with low-level graphics routines for performing graphics tasks. The stack also includes virtualized GPUs. The cores of respective virtualized GPUs are loaded with the same low-level language graphics routine for performing the same graphics task. The virtualization stack also includes a dispatcher for receiving the graphics job request from the CPU. The dispatcher assigns graphics tasks to the virtualized GPUs based on the graphics job request from the CPU depending on the tasks and workload requirements of the graphics job request. After processing by the virtualized GPUs, the results of the graphics job request are returned to the CPU.

These and other advantages and features of the embodiments herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Embodiments relate to highly parallel virtualized graphics processors. A highly parallel virtualized processor enables a computer to leverage a graphics processor to provide the necessary computing power to efficiently handle graphics applications, particularly geospatial graphics applications. For example, the virtualized graphics processor performs process-intensive tasks efficiently and effectively. The highly parallel virtualized processor enables 3D real-time rendering and visualization of digital twins, such as a digital twin for a water plant as well as other digital twin applications.

The virtualized high parallel processor, in one embodiment, is a virtualized graphics processor and includes artificial intelligence (AI) rendering pipeline that streams and compresses 3D content over the network to a plethora of devices, such as computers, tablets and smartphones as well as other types of devices. For example, the virtualized processor is compatible with various types of devices, such as laptops, desktops, tablets and other types of devices such as those with a graphics processor. The virtualized processor is compatible with various operating systems or environments, such as Windows, macOS, Linux as well as other operating systems.

Figure 1:
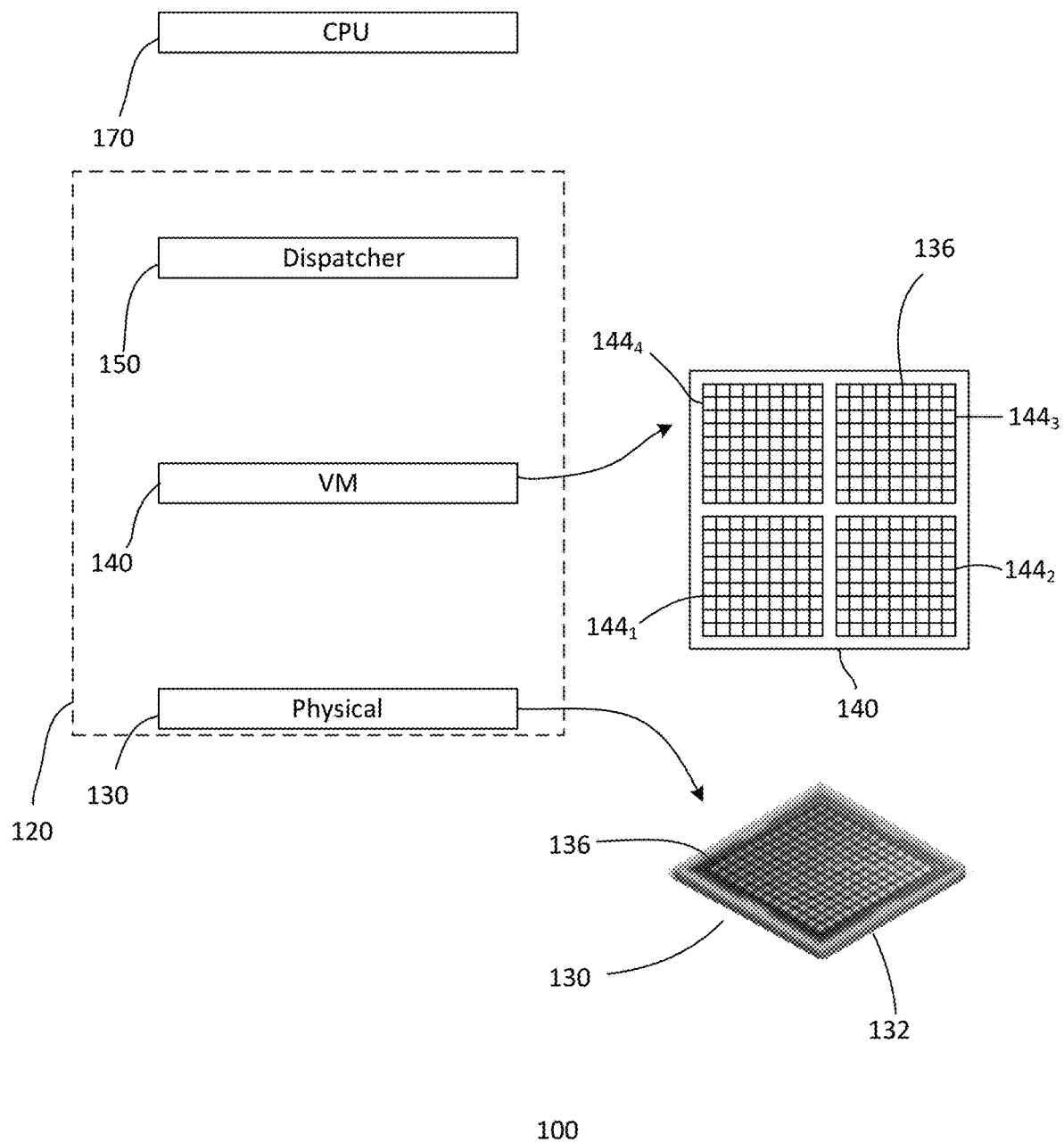
FIG. 1 shows a simplified diagram of an embodiment of a processing system.

FIG. 1 shows an embodiment of a processing system 100. The processing system, for example, may be a computing system, such as a desktop computer, a laptop computer or a tablet computer. Other types of computing systems may also be useful. The processing system includes a central processing unit (CPU) 170 and a virtualization stack 120. Various types of CPUs may be employed by the processing system. The processing system may include an operating system. For example, the CPU may be from Intel, AMD or Apple running Windows, Linux or macOS. Other types of CPUs or operating systems may also be useful.

The computing system may include internal memory. The internal memory may include different types of memory, such as random access memory (RAM), cache memory and a hard drive or hard drives. Other types of internal memories may also be useful. The computing system may also include external memory storage.

The CPU is configured to operate with the virtualization stack. The virtualization stack includes various layers or levels. The lowest layer 130 of the stack may be, for example, referred to as a physical layer. The physical layer, in one embodiment, includes a graphics processing unit (GPU) 132. The GPU, for example, is part of a GPU card. The GPU, in one embodiment, includes hundreds to thousands of GPU cores 136. The GPU, for example, may be a GPU from NVIDIA®. Other types of GPUs may also be useful. In the case of an NVIDIA® GPU, the GPU cores are CUDA® cores.

In one embodiment, the cores of a GPU are configured for parallel processing of, for example, 3D graphics tasks. In one embodiment, the cores are configured to perform geospatial graphics tasks. For example, the cores are configured for performing tasks related to processing 2D satellite imagery into a 3D map. Such tasks, for example, may include shadow removal, footprint detection, height computation, cloud removal, building envelope detection, level of detail (LOD), DEM/DSM/DTM computation, and polygon generation. The cores may be configured to perform other types of graphics tasks as well as highly process-intensive computational tasks.

In one embodiment, a core of the GPU is dedicated to perform a specific graphics or compute task. For example, the task which the GPU core is dedicated to perform is determined by the code or routine residing in the core. In one embodiment, the routine for the task is written in a low-level programming language of the core. For example, in the case of a CUDA® core of an NVIDIA® GPU, the low-level programming language is the Vulkan® programming language. Other low-level programming languages may also be useful. Depending on the task, the core is loaded with the appropriate low-level language routine.

A virtualization layer 140 is disposed above the physical layer. The virtualization layer includes virtual machines (VMs) 144. For example, the virtualization layer includes virtualized GPUs. A virtualized GPU includes GPU cores 136. For example, the cores of the GPU in the physical layer are virtualized or segmented into VMs. As shown, the GPU is virtualized into four VMs $144_{1-4}$. Segmenting the cores of the GPU into other numbers of VMs may also be useful. In one embodiment, the number of VMs may depend on the number of tasks associated with the groups of GPU cores. For example, each VM includes cores loaded with the same low-level language routine.

A top layer 150 of the virtualization stack is a dispatcher layer. The dispatcher layer includes a dispatcher which is configured to receive graphics job requests from the CPU. For example, graphics job requests are generated when the CPU runs a graphics application. Receiving other types of job requests from the CPU may also be useful. A job request may include the different types of tasks as well as different workloads.

In one embodiment, depending on the job and its workload requirement, the dispatcher initiates a specified number of cores from the appropriate VMs. The number of cores may depend on the workload of the job. Once the job is completed, the dispatcher returns the result to the CPU. As jobs are continuously received by the dispatcher, it is also responsible for multiplexing jobs to each core or a pool of GPU cores of the VMs.

By virtualizing a GPU to perform dedicated tasks with low-level language routines, graphics programs, such as 2D to 3D geospatial graphics and process-intensive programs can be executed efficiently and effectively. For example, the virtualized GPU enables 3D real-time rendering and visualization of digital twins, such as a digital twin for a water plant as well as other digital twin applications efficiently and effectively.

Figure 2:
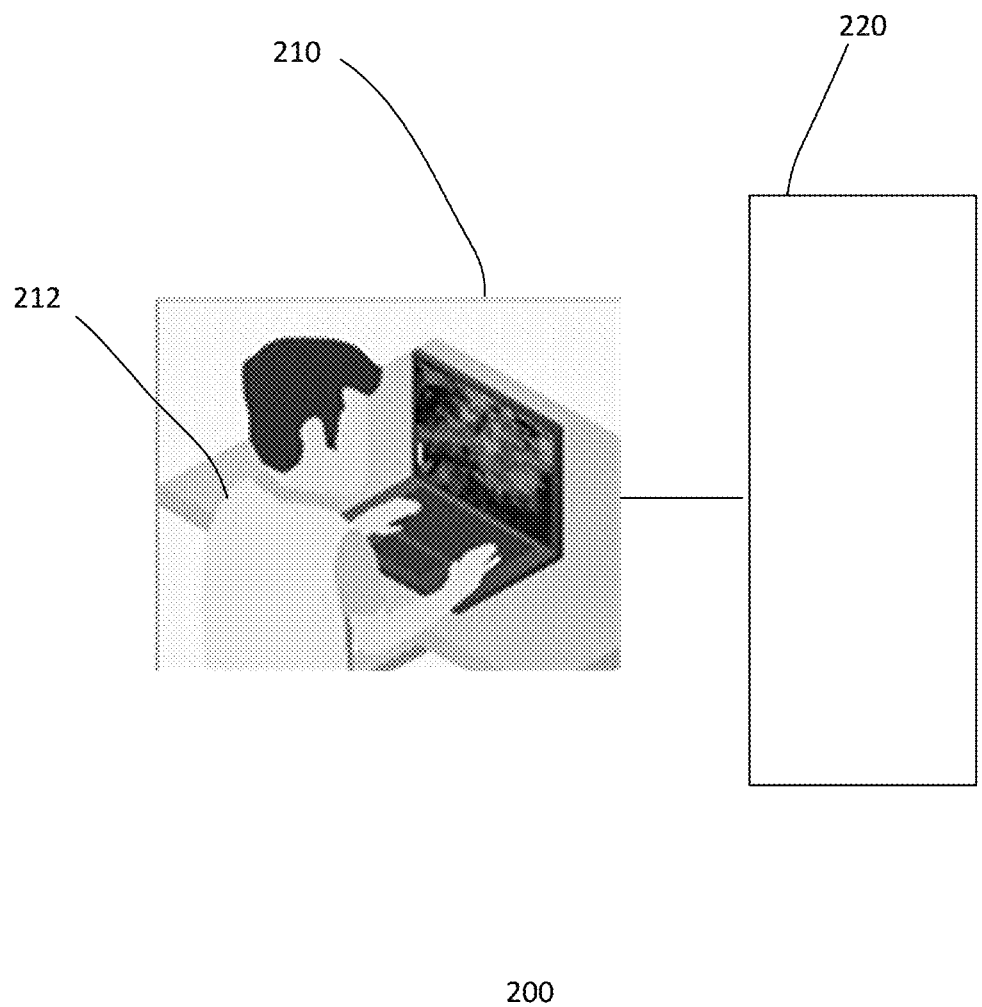
FIG. 2 illustrates accessing the highly parallel virtualized graphics processor by a user.

FIG. 2 illustrates accessing a virtualized processor 200. As shown, a user 212 accesses a virtualized stack 220 using a device 210. The user has end-to-end visibility of the visualization stack of the virtualized graphics processor.

Figure 3:
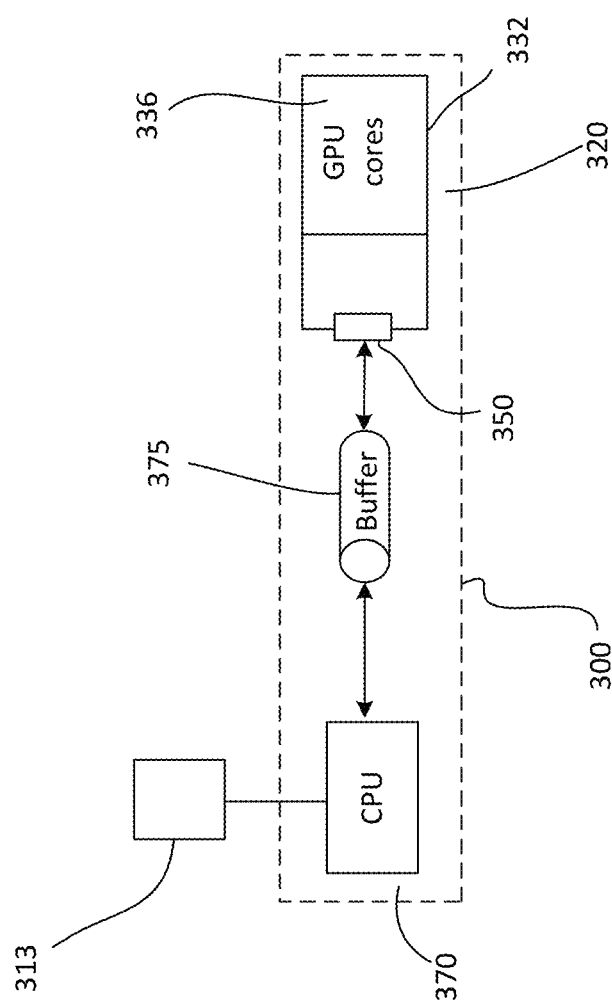
FIG. 3 shows a simplified block diagram of a processing system with a highly parallel virtualized graphics processor.

FIG. 3 shows a simplified block diagram of a processing system 300 with a highly parallel virtualized graphics processor. The processing system is similar to that described in FIG. 1. Common elements may not be described or described in detail.

As shown, the processing system includes a CPU 370. The CPU is configured to operate with a virtualized GPU 320. The virtualized GPU includes a dispatcher 350 and a GPU 332 having hundreds to thousands of GPU cores. For example, the GPU may be a GPU from NVIDIA® with hundreds to thousands of CUDA® cores. Other types of GPUs may also be useful.

The GPU cores are configured for parallel processing of, for example, 3D graphics tasks. In one embodiment, the cores are configured to perform geospatial graphics tasks. For example, the cores are configured for performing tasks related to processing 2D satellite imagery to produce a 3D map. Such tasks, for example, may include shadow removal, footprint detection, height computation, cloud removal, building envelope detection, level of detail (LOD), DEM/DSM/DTM computation, and polygon generation. The cores may be configured to perform other types of graphics tasks as well as highly process-intensive computational tasks.

In one embodiment, a core of the GPU is dedicated to perform a specific graphics or compute task. For example, the task which the GPU core is dedicated to perform is determined by the code or routine residing in the core. In one embodiment, the routine for the task is written in a low-level programming language of the core. For example, in the case of a CUDA® core of an NVIDIA® GPU, the low-level programming language is the Vulkan® programming language. Other low-level programming languages may also be useful. Depending on the task, the core is loaded with the appropriate low-level language routine.

In one embodiment, the cores are segmented into VMs or virtual GPUs. The VMs, for example, are configured to perform specific tasks. Different VMs are configured to perform different tasks. The number of VMs may depend on the number of tasks required.

A dispatcher 350 manages the VMs. For example, the dispatcher receives job requests from the CPU and assigns tasks to the different VMs. The dispatcher, for example, serves as a VM manager. Depending on the type of tasks and workload, appropriate VMs and the number of cores are assigned.

The CPU communicates with the dispatcher through a buffer 375. The buffer, for example, may be a bus, enabling requests from the CPU to be sent to the dispatcher for assigning tasks to the virtualized GPUs.

In operation, the CPU runs a computer program 313. The computer program, in one embodiment, is a graphics program, such as converting 2D satellite imagery into a 3D map. Running other types of programs by the CPU may also be useful. In one embodiment, graphics jobs, such as geospatial tasks are sent to the dispatcher via the buffer. A job includes tasks and workload requirements. The dispatcher assigns the tasks to the appropriate number of cores of the VMs for processing based on task and workload requirements. The results are returned to the CPU via the buffer.

In operation, the CPU runs a computer program 313. The computer program, in one embodiment, is a graphics program, such as converting 2D satellite imagery into a 3D map. Running other types of programs by the CPU may also be useful. In one embodiment, graphics jobs, such as geospatial tasks are sent to the dispatcher via the buffer. A job includes tasks and workload requirements. The dispatcher assigns the tasks to the appropriate number of cores of the VMs for processing based on task and workload requirements. The results are returned to the CPU via the buffer.

Figure 4:
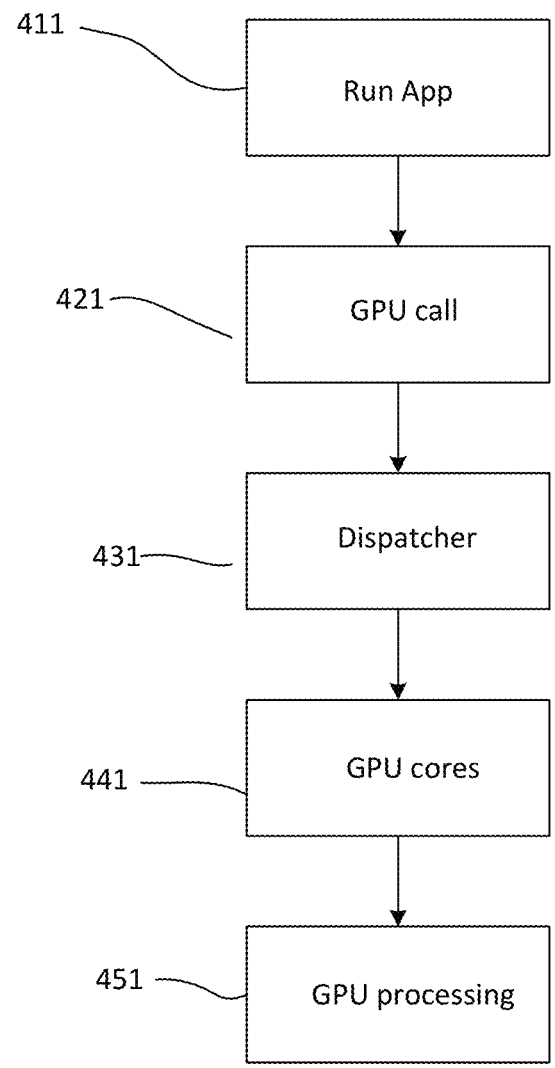
FIG. 4 shows a simplified process flow of an embodiment of a processing system with a highly parallel virtualized graphics processor.

FIG. 4 shows a simplified process flow 400 of an embodiment of a processing system with a highly parallel virtualized graphics processor. At 411, the processing system is configured to run a computer program or application. For example, the CPU of the processing system is configured to run the computer program. The computer program, for example, is a graphics program, such as one which converts 2D satellite imagery into a 3D map. Other types of computer programs may also be run by the CPU.

At 421, the CPU calls the virtualized GPU to perform a graphics job, as required by the computer program. For example, the CPU generates a graphics job request for the GPU to perform. The job request, for example, includes the graphics tasks and associated workload required to perform the job. Such tasks, for example, may include shadow removal, footprint detection, height computation, cloud removal, building envelope detection, level of detail (LOD), DEM/DSM/DTM computation, and polygon generation. Other types of tasks may also be useful. The job request is configured for the dispatcher of the virtualized GPU. For example, the job request can be read and understood by the dispatcher. The job request is sent to the dispatcher of the virtualized GPU at 431. In one embodiment, the job request is sent to the dispatcher via a buffer between the CPU and virtualized GPUs.

The dispatcher, at 441, receives the job request from the CPU. The dispatcher assigns tasks to the different VMs of the virtualized GPU. The dispatcher, for example, serves as a VM manager. Depending on the type of tasks and workload, appropriate VMs and the number of cores are assigned. The VMs processes the job request and returns the results to the CPU via the buffer.

The present disclosure may be embodied in other specific forms without departing from the spirit or essential characteristics thereof. The foregoing embodiments, therefore, are to be considered in all respects illustrative rather than limiting the invention described herein. Scope of the invention is thus indicated by the appended claims, rather than by the foregoing description, and all changes that come within the meaning and range of equivalency of the claims are intended to be embraced therein.

The invention claimed is:

1. A processing system comprising:
   a central processing unit (CPU); and
   a virtualization stack, wherein the virtualization stack comprises,
      a graphics processing unit (GPU) having a multitude of GPU cores,
      the GPU cores are loaded with low-level graphics routines for performing graphics tasks,
      virtualized GPUs, wherein cores of respective virtualized GPUs are loaded with the low-level language graphics routine for performing the graphics tasks as the GPU cores, and
      a dispatcher for assigning graphics tasks to virtual machines (VMs) based on a graphics job request from the CPU depending on tasks and workload requirements of the job request.

2. The processing system of claim 1 wherein the GPU comprises an Nvidia® GPU with CUDA® cores.

3. The processing system of claim 2 wherein the low-level programming language or the low-level language graphics routines comprises Vulkan® programming language.

4. The processing system of claim 3 wherein the low-level language graphics routines comprise geospatial low-level language graphics routines.

5. The processing system of claim 4 wherein the geospatial low-level language graphics routines comprise:
   a shadow removal routine;
   a footprint detection routine;
   a height computation routine;
   a cloud removal routine;
   a building envelope detection routine;
   a level of detail (LOD) routine;
   DEM/DSM/DTM computation routine; and
   a polygon generation routine; or a combination thereof.

6. The processing system of claim 1 wherein the low-level language graphics routines comprise geospatial low-level language graphics routines.

7. The processing system of claim 6 wherein the geospatial low-level language graphics routines comprise:
   a shadow removal routine;
   a footprint detection routine;
   a height computation routine;
   a cloud removal routine;
   a building envelope detection routine;
   a level of detail (LOD) routine;
   DEM/DSM/DTM computation routine; and
   A polygon generation routine; or a combination thereof.

8. The processing system of claim 1 wherein the GPU cores are segmented into x virtualized GPUs, where x is equal to x groups of GPU cores with the low-level language graphics routines.

9. The processing system of claim 1 wherein the dispatcher comprises a software dispatcher for managing the VMs.

10. The processing system of claim 1 comprises a buffer in a communication path between the CPU and the virtualization stack.

11. The processing system of claim 1 wherein the CPU is configured to run a graphics program.

12. The processing system of claim 11 wherein the graphics program comprises a geospatial graphics program.

13. A method for highly parallel processing of a graphics program comprising:

running the graphics program by a central processing unit (CPU);

generating a graphics job request according to the graphics program;

sending the graphics job request to a virtualization stack, wherein the virtualization stack comprises, a graphics processing unit (GPU) having a multitude of GPU cores, the GPU cores are loaded with low-level graphics routines for performing graphics tasks, virtualized GPUs, wherein cores of respective virtualized GPUs are loaded with the low-level language graphics routine for performing the graphics tasks as the GPU; and a dispatcher for receiving the graphics job request from the CPU;

assigning graphics tasks to the virtualized GPUs based on the graphics job request from the CPU depending on tasks and workload requirements of the graphics job request; and returning results of the graphics job by the virtualized GPUs to the CPU.

14. The method of claim 13 wherein the GPU comprises an Nvidia® GPU with CUDA® cores.

15. The method of claim 14 wherein the low-level programming language or the low-level language graphics routines comprises Vulkan® programming language.

16. The method of claim 15 wherein the low-level language graphics routines comprise geospatial low-level language graphics routines.

17. The method of claim 16 wherein the geospatial low-level language graphics routines comprise:

a shadow removal routine;

a footprint detection routine;

a height computation routine;

a cloud removal routine;

a building envelope detection routine;

a level of detail (LOD) routine;

DEM/DSM/DTM computation routine; and a polygon generation routine; or a combination thereof.

18. The method of claim 1 wherein the GPU cores are segmented into x virtualized GPUs, where x is equal to x groups of GPU cores with the low-level language graphics routines.

19. The method of claim 13 wherein the dispatcher comprises a software dispatcher for managing the VMs.

20. The method of claim 13 comprises a buffer in a communication path between the CPU and the virtualization stack.

* * * * *